May 27, 1930.  B. M. SHIPLEY  1,760,783
CASH REGISTER
Filed Dec. 17, 1927   3 Sheets-Sheet 1

Inventor
Bernis M. Shipley
By Carl Beust
Ralph E. Warfield
His Attorneys

May 27, 1930. B. M. SHIPLEY 1,760,783
CASH REGISTER
Filed Dec. 17, 1927 3 Sheets-Sheet 2

Inventor
Bernis M. Shipley
By Earl Benst
Ralph S. Warfield.
His Attorneys

May 27, 1930. B. M. SHIPLEY 1,760,783
CASH REGISTER
Filed Dec. 17, 1927 3 Sheets-Sheet 3
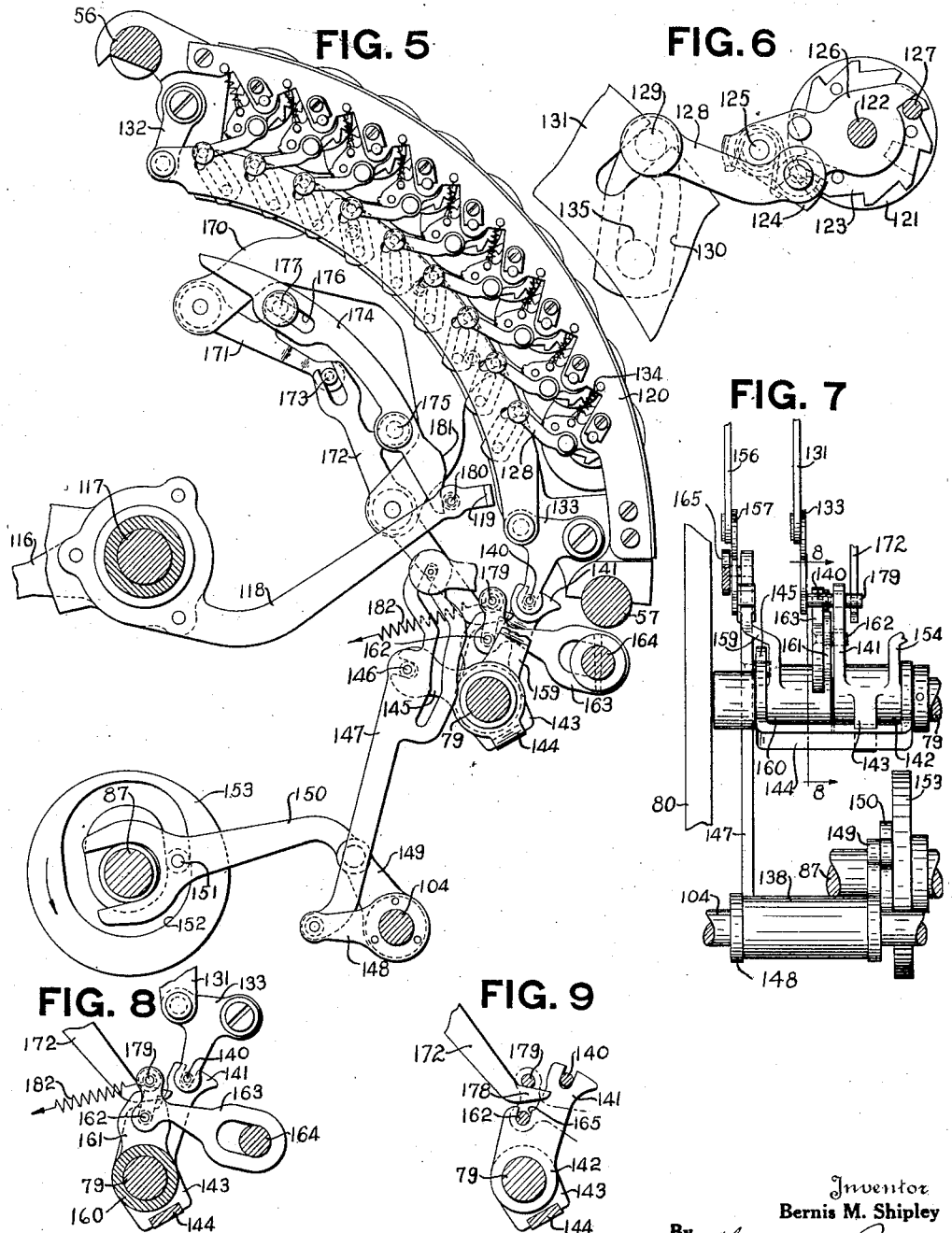
Inventor
Bernis M. Shipley
By Carl Beust
Ralph S. Warfield
His Attorneys Patented May 27, 1930

1,760,783

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed December 17, 1927. Serial No. 240,725.

This invention relates to cash registers and the like machines, and is more particularly directed to improvements in the means to control the clerks' and transaction special counters of such machines.

The invention in the form or embodiment disclosed herein, is adapted to be applied to a machine of the type illustrated and described in Letters Patent of the United States No. 1,394,256, issued on October 18, 1921 to F. L. Fuller, and in Letters Patent No. 1,619,796, issued March 1, 1927 to B. M. Shipley.

In machines constructed in accordance with the above-named patents, it is customary to provide, in addition to the rows of keys by means of which amounts are set up, one or more rows of keys, the individual keys of which are assigned to the respective clerks who operate the machine.

The machine may be so arranged that it is necessary for a clerk to depress the particular key assigned to him, before the machine can be operated, to the end that each clerk operating the machine shall identify himself with the particular transaction entered in the machine.

Of course, the keys of this special row or rows may be assigned to various departments, the transactions relating to which are entered on this particular machine, but in the form of machine herein selected for illustration, a row of keys individual to various transactions is provided.

It has been customary to associate a counter with each clerk's key and each transaction key, the separate counters adapted to register the number of times the respective clerks have operated the machine, and the number of transactions of each order, as "cash," "charge," "paid out," and the like.

An object of this invention is to produce a novel control for such special counters, whereby the special counters of one bank or row of keys are disabled by the selection of certain special counters in another bank or row of keys.

Heretofore, in machines of this class, "one" was added into the special counter associated with the particular clerk's key depressed. This occurred regardless of whether the transaction was a bona fide sale, or a "paid-out" or "no-sale" transaction. The clerk, therefore, had no way of knowing how many bona fide sales he had made during the day. It is the purpose of the present invention to disable the clerks' special counters when a "paid-out" or "no-sale" transaction key is depressed, so that only "cash," "charge," or other bona fide sales will be recorded on the clerks' special counters.

With this and incidental objects in view, the invention consists of certain novel features of construction and combinations of parts, the essential elements of which are set forth in appended claims and preferred forms or embodiments of which are hereinafter described with reference to the drawings which accompany and form a part of this specification.

In said drawings:

Fig. 5 is a view in left elevation of a bank of transaction special counters with the operating mechanism therefor, and the disabling mechanism for the clerks special counters.

Fig. 6 is a detail side view of one of the special counters.

Fig. 7 is a fragmentary view in front elevation of the uncoupling or disabling device.

Fig. 8 shows a part of the disabling mechanism, looking from the left.

Fig. 9 shows another part of the same mechanism, looking from the left.

Figure 1:
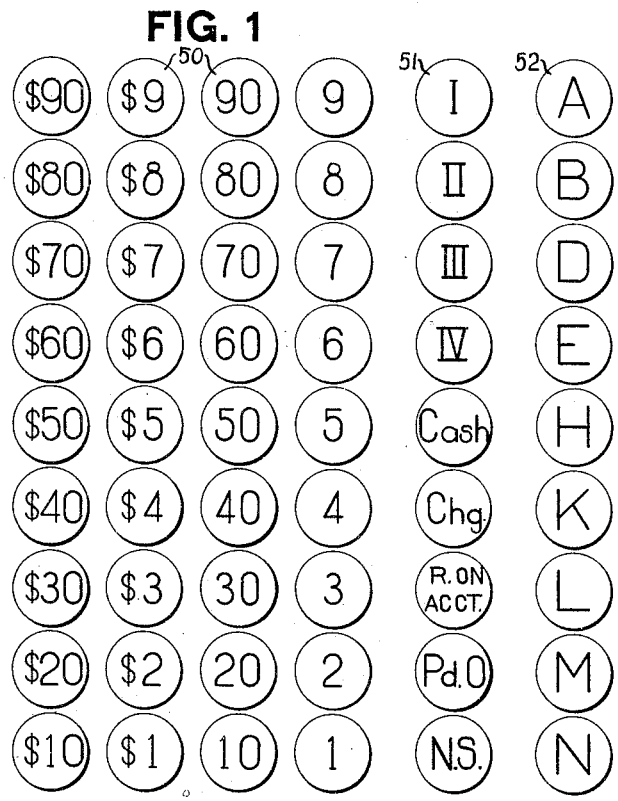
Fig. 1 is a diagrammatic view of one form of keyboard arrangement illustrating the invention.

Described in general terms, the machine to which the present invention is shown applied, includes a plurality of totalizers, (not shown) a keyboard (Fig. 1) containing a plurality of banks of keys 50 for setting up the amount to be entered upon the totalizers, and also rows of keys, as 51 and 52, to control the selection of the particular totalizers on which such amounts are to be entered. Printing mechanism and indicators (not shown) may be provided in the machine, no further mention of which, however, will be included herein.

A plurality of special step by step counters are provided for counting the respective number of transactions of each selecting key.

Keyboard

The keyboard of the machine selected to illustrate the present invention is similar to that illustrated and described in the patents above referred to, and includes, generally, a plurality of banks of amount keys 50 (Fig. 1), a bank of transaction keys 51, a bank of clerks' keys 52, a bank of transaction special counters 53, and a bank of clerks' special counters 54. Depression of the amount keys 50 sets up the amounts to be entered on the machine, and as they do not form a part of the present invention, no further mention thereof need be made.

The transaction keys 51 (Figs. 1 and 4) are for the purpose of selecting a particular totalizer (not shown) of a plurality of totalizers, into which the amount set up by depression of the amount keys is to be added. The transaction keys also select special indicators and set up the transaction characters on the printing elements, all of which is not shown herein.

Each transaction key 51 controls a particular counter of the row or bank of special counters 53 through a differentially adjustable selecting mechanism, whereby the particular counter selected may have "1" added thereto, to indicate that its particular transaction key has been depressed and the machine operated.

The clerks' keys 52 (Fig. 1) are for the purpose of selecting the particular clerk's totalizer into which is accumulated the amount entered in the machine by each individual clerk. The clerks' keys 52, like the transaction keys 51, also control differential mechanism for selecting the clerks' special counters 54.

Transaction keys

The transaction keys 51, (Fig. 4), and the differential mechanism controlled thereby are shown in the art cited above. However, a brief description thereof will be included herein, as they co-act with the novel features hereinafter set forth.

Figure 4:
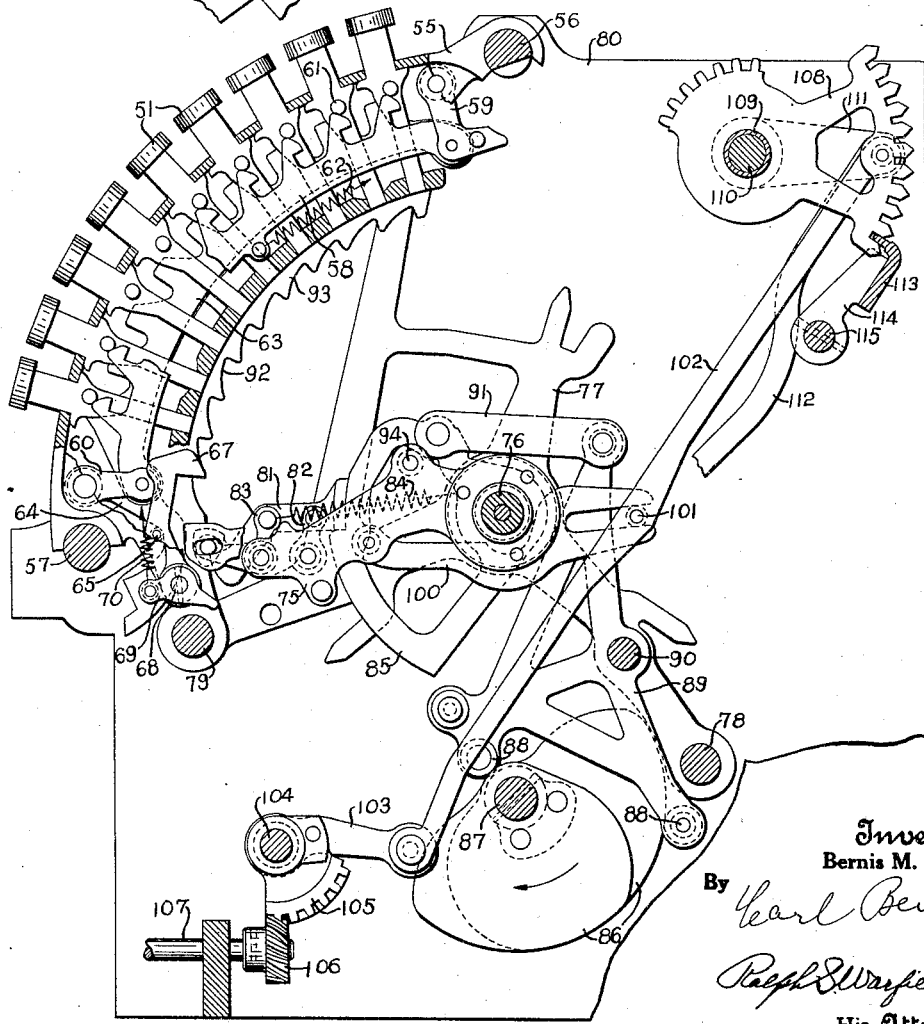
Fig. 4 is a view in right elevation of a bank of transaction keys and the differential mechanism therefor.

These keys 51, are mounted in a key frame 55, supported in the machine on two transversely extending, parallel rods 56 and 57. A detent bar 58 pivotally mounted on two arms 59 and 60, which, in turn, are pivotally mounted on the frame 55, co-operates with a stud 61 on each key stem to hold a depressed key in such position. The detent bar carries a hook located beneath the stud 61 on each key stem. Depression of one of the transaction keys 51 forces its stud 61 against the bevelled bill of its hook to shift the detent bar 58 downwardly in a counter-clockwise direction (Fig. 4). After the stud 61 has passed the bill of the hook, a spring 62 returns the detent bar to its normal position, thereby snapping the associated hook over the stud 61, to hold the key in its depressed position.

As above stated, a differential mechanism is associated with the bank of transaction keys 51 and with the bank of clerks' keys 52.

Normally an arm 75 of each differential mechanism lies one step beneath its zero position, or two steps beneath the position of the lowest key in its respective row. And to arrest the differential mechanisms in their zero positions when no key has been depressed in their respective rows, it is customary to provide zero stop pawls 67 in the paths of latches 81 which releasably connect the differential arms with their actuators 85.

However, these zero stop pawls must be displaced when a key is depressed in one of the banks of clerks' or transaction keys, which displacement is generally effected as follows:

The transaction keys 51 operate a release bar 63 (Fig. 4) lying parallel with the detent bar 58 but on the opposite side of the key stems. The release bar is pivotally mounted at its upper end on an arm similar to the arm 59, which supports the detent bar 58. At its lower end, the release bar 63 is pivotally mounted on a swinging arm 64. The release bar 63 has inclined edges formed therein, one beneath each of the key pins 61 which extend through the key stems. Depression of one of the keys 51 will force its pin 61 to contact with its respective inclined edge of the release bar 63, and cam the release bar downwardly. This movement of the release bar 63 rocks the arm 64 clockwise. The free end of the arm 64 is hooked over a stud 65 in the zero stop pawl 67, and as the arm 64 is rocked clockwise, it will rock the zero stop pawl 67 counter-clockwise to its ineffective position. The zero stop pawl 67 is pinned to a short shaft 68 journaled in a projection of the frame 55. A spring 70 connected to an arm 69 pinned to the shaft 68 tends to rock the arm 69, shaft 68 and stop pawl 67 clockwise. When the detent bar 58 is released near the end of the operation of the machine, by well known means set forth in the above mentioned patents and not herein shown, a spring (not shown) returns the depressed key 51 to its normal position and frees the release bar 63. The spring 70 then rocks the arm 69, shaft 68 and zero stop pawl 67 clockwise to their normal positions, which movement through the stud 65, rocks the arm 64 counter-clockwise to return the detent 63 to its normal position.

Transaction differential mechanism

The differential mechanism is used in conjunction with the transaction keys 51 for the purpose of selecting the particular totalizer corresponding to the transaction key depressed. This differential also adjusts the indicators (not shown) and the printing elements, also not shown. In the present invention, this differential mechanism is also made use of to select the particular transaction special counter associated with the depressed transaction key.

The transaction differential mechanism includes an arm 75 (Fig. 4) pivoted on a stud 76, supported between a pair of stationary hangers 77, only one of which is shown herein. The hangers 77 are mounted on two rods 78 and 79, extending between the side frames 80 of the machine, only one of which is shown. A link 82 and a bell crank 83 pivoted to the outer end of the differential arm 75, pivotally supports a latch 81 in such manner that it extends beyond the free end of the arm 75. A spring 84 holds a foot on the latch 81, in engagement with a shoulder on an invariably movable segment or actuator 85. This segment or actuator 85 is given a constant excursion at each operation of the machine, by means of a pair of cams 86, pinned to a drive shaft 87. The cams 86 co-operate with two rollers 88, carried by a bell-crank lever 89, pivoted on a stud 90 in the stationary hanger 77. A link 91 connects the upper end of the bell-crank lever 89 with the segment or actuator 85. The cams 86 make one complete rotation in clockwise direction at each operation of the machine, to rock the bell-crank lever 89 first clockwise, and then back to normal. This movement of the bell-crank lever, through the link 91, imparts a constant excursion to the segment or actuator 85. As the latch 81 is carried upwardly by the segment or actuator 85, the projecting end of the bell crank 83 strikes and is arrested by the zero stop pawl 67 or the end of a depressed key, and continued advance of the actuator 85 will rock the bell crank 83 counter-clockwise to disconnect the latch 81 from the actuator 85. At the same time, a nose on the latch 81 enters a notch 92 in a serrated bar 93, supported at its lower end on a rod 79, and at its upper end on the hanger 77, to lock the differential mechanism in its adjusted position.

On its return movement an inner surface of the driving segment 85 (Fig. 4) contacts a stud 94 on the arm 75 and returns said arm to its normal position.

As the shoulder on the driving segment 85 arrives opposite the foot of the latch 81 the spring 84 withdraws the latch from the notch 92 in the serrated bar 93 and engages the foot of the latch with the shoulder on the driving segment so that the latch 81 and arm 75 will be carried upwardly on the next operation of the machine.

To adjust the indicators (not shown) and the printing elements (not shown), and to select the special counters 53 (Figs. 1 and 5), a rearwardly-extending beam 100 (Fig. 4) is pivoted at its front end to the differentially movable arm 75. The rear end of the beam 100 is bifurcated to straddle a stud 101 mounted in a link 102. The lower end of the link 102 is pivoted to an arm 103 free on a shaft 104 supported in the side frames 80 of the machine. A spiral segment gear 105 fast on the arm 103 meshes with a spiral pinion 106 pinned to a shaft 107. The shaft 107 extends into the printing mechanism, not shown herein, for adjusting the type carriers. The upper end of the link 102 is pivoted to a serrated segment 108 secured to one end of a tube 109, surrounding a shaft 110, supported in the side frames 80 of the machine. An arm 111 fast to the opposite end of the tube 109, has pivoted thereto a link 112, the purpose of which will be hereinafter described.

A universal aligner 113 (Fig. 4) having its free edge bent over to engage notches formed in the segment 108, is supported on a plurality of arms 114, pinned to a shaft 115, mounted in the side frames of the machine. Any suitable means may be employed to operate the aligner 113.

The clerks' keys 52 (Fig. 1) are mounted in a bank, the same as the bank 51 for the transaction keys. The structure of this bank and its differential mechanism is similar to that of the transaction bank and its differential mechanism. Therefore, no further description thereof is necessary.

The foregoing mechanism constitutes a part of this invention only in so far as it co-acts therewith to attain the desired result, and reference is made to the above mentioned patents for a full and complete description thereof.

Transaction special counters

The special counters (Fig. 5) are of the usual step-by-step type and the particular form or embodiment illustrated herein is old and well known in the art as shown by the above mentioned patent to Fuller, No. 1,394,256. As the present invention is more particularly directed to the operating mechanism and the control of the operating mechanism for the clerks' and transaction special counters, but a brief description of the counters themselves will be included herein.

The link 112 (Fig. 4), which is differentially adjusted under control of the transaction keys 51, is pivoted at its lower end (not shown) to the left-hand end of an arm 116 (Fig. 5), pivoted on a stud 117 in the left side frame 80 of the machine. The pivotal connection between the link 112 and its arm 116 is identical with the pivotal connection between the link 112 and arm 116 for the clerks' bank of keys and special counters shown in Fig. 2. The link 112 differentially positions the arm 116 to the forward end of which is fastened an arm 118 (Fig. 5) terminating in a nose 119 which is thereby positioned opposite the special counter corresponding with the particular transaction key depressed, to select such special counter for operation.

Each of the banks of special counters contains nine counters. The transaction special counters are mounted in a frame 120 (Fig. 5) similar to the key frame 55, and supported in the machine on the rods 56 and 57, previously described. Each of these counters consists of a plurality of counter wheels 121 (Fig. 6) journaled on a shaft 122. Pinned to each of the counter wheels 121 is a ratchet 123, driven by a graduated tined pawl 124. The pawl 124 is pivoted on a stud 125 in a bail 126, journaled on the shaft 122. The bail 126 is rocked first counter-clockwise and then clockwise to normal to feed the units counter wheel 121 one step at each operation of the machine, and to effect the carry of "tens" in the usual manner. Movement of the bail 126 is limited in one direction by means of a stud 127 (Fig. 6) mounted in the frame 120. A toggle link 128, 130 is associated with each counter mechanism to actuate the bail. The outer end of one link 128 of each toggle link is pivotally connected to the pawl-supporting bail 126 of its respective counter, and the inner end of the link 128 is pivotally connected by a stud 129 to its complementary and slotted link 130. The stud 129 of each toggle projects through its respective slot formed in a universal slotted operating bar 131, pivoted at its upper and lower ends to a link 132 and a driving arm 133, respectively, pivoted to the counter frame 120. Guide studs 135 in the counter frame 120 enter the slot in each link 130.

During the operation of the machine, the driving arm 133 connected to the notched operating bar 131, is given a counter-clockwise movement, thereby lowering said bar 131. The mechanism for rocking the driving arm 133 and thereby lowering the notched operating bar 131 to operate the selected special counter will be later described. It will be recalled that the selecting arm 118 is differentially adjusted under the control of the key 51 depressed, so that the nose 119 of the selecting arm will be opposite one of the slotted links 130. The notched operating bar 131, as it moves downwardly, carries with it the series of studs 129 of the several toggle links 130, 128, which studs lie at the outer ends of the notches in the bar. Pressure on the pivot studs 129 tends to straighten all the toggles, the slotted links 130 freely sliding inwardly guided by the pins 135. Such straightening and flexing of the toggle links where unimpeded, is wholly idle, and no motion is communicated to their respective special counters 121. The nose 119 of the selecting arm 118, however, does prevent the inward sliding of the particular slotted link 130, corresponding with the particular transaction key depressed. As this toggle is straightened by the farther movement of the operating bar 131, the link 128 is thrust in the direction of its length, thereby rocking the bail 126 about its pivot 122 in a counter-clockwise direction, which through the pawl 124 and ratchet 123, causes the units counter wheel 121 to advance one step.

The mechanism for actuating the operating bar 131 will now be described. The actuating arm 133 carries a stud 140 (Figs. 7, 8 and 9), which projects through a slot formed in the free end of an arm 141 projecting upwardly from a hub 142 freely mounted on the supporting rod 79, previously described. The hub 142 carries a lug 143 projecting therefrom, the outer end of which lug is channeled to fit over a yoke 144 loosely mounted on the rod 79. An arm 145, forming part of the yoke 144 at its outer end, as viewed in Figure 7, is bifurcated to straddle a stud 146 (Fig. 5) in a link 147. At its lower end, the link 147 is pivoted to an arm 148, fast on a hub 138 (Fig. 7) on the shaft 104, previously mentioned. The upper end of the link 147 is guided by a stud on the free end of an arm 165. The other end of the arm 165 is not shown, but it is mounted on the shaft 164, as shown in the Fuller Patent, No. 1,394,256. Also fast to the hub 138 is an arm 149, to which is pivoted a pitman 150 bifurcated at its opposite end to straddle the drive shaft 87. A roller 151 on the pitman 150 projects into a cam race 152 formed in a cam disk 153, pinned to the main drive shaft 87. The cam 153 makes one counter-clockwise rotation (as viewed in Fig. 5) at each operation of the machine. Due to the configuration of the cam race 152, the pitman 150 will be moved first to the right and then back to its normal position. This movement will rock the arm 149, shaft 104 and arm 148 clockwise, thereby raising the link 147. The upward movement of the link 147 rocks the arm 145, yoke 144 and the hub 142 clockwise, as viewed in Figures 5, 8 and 9. The clockwise movement of the hub 142 and the arm 141 will rock the driving arm 133 counter-clockwise to lower the notched operating bar 131 and actuate the special counter selected, as above described.

A second arm 154 (Fig. 7) similar to the arm 141, projects upwardly from the hub 142, for actuating a third bank of special counters. Since the structure and operation of this bank of special counters is identical with that of the transaction bank of special counters, just described, no further description thereof will be included herein.

The bank of clerks' special counters 54 (Fig. 1) is located to the left of the transaction special counters 53. The clerks' special counters, are mounted in a frame 162 (Fig. 2), only a portion of which is shown, exactly like the frame 120 for the transaction counters 53. The frame 162 is likewise supported on the rods 56 and 57. These counters 54 are selected by means of pivoted arm 155 in a manner similar to the manner in which the transaction counters 53 are selected. As mentioned above, the clerks' bank of keys 52 is provided with a differential mechanism similar to the differential mechanism for the transaction banks, illustrated in Fig. 4. This differential mechanism for the clerk's bank of keys adjusts the arm 155 (Fig. 2) according to the clerk's key depressed. The bank of clerks' counters 54 is provided with a notched operating bar 156 pivotally mounted at its upper end on a link (not shown but like the link 132) and at its lower end on a driving arm 157. The notched operating bar 156 is shifted downwardly, as will hereinafter be described, to operate the selected clerk's counter in a manner like that for the transaction bank of counters. The driving arm 157 supporting the lower end of the notched operating bar 156, (Fig. 2) carries a stud 158 which projects through a slot in an arm 159 (Figs. 2, 5 and 7) extending from one end of a hub 160, free on the rod 79. An upwardly extending arm 161 (Figs. 7 and 8) at the opposite end of the hub 160, is slotted to accommodate a stud 162 carried by a side 163. The outer end of the slide 163 is slotted to accommodate a stud 162 carried by a slide in the direction of its length transversely of the shaft 164. The stud 162 is sufficiently long to project through a slot 165 (Figs. 7 and 9) in the arm 141 on the hub 142 previously described. It will be recalled that the arm 141 is rocked during the operation of the machine to operate the special counters 53 for the transaction bank 51. Due to the pin and slot connection 162, this rocking movement of the arm 141 is transmitted to the arm 161, and therefore, to the hub 160 and arm 159 (Figs. 2, 7 and 8) for the purpose of rocking the driving arm 157 to lower the notched operating bar 156, and operate the selected special counter corresponding with the clerk's key depressed.

*Clerks' special counter disabling mechanism*

Mechanism will now be described whereby a special key, as "no-sale" key sets mechanism to disable the clerks' special counters upon operation of the machine. This mechanism is best shown in Figure 5, and in modified form in Figure 3.

A bracket 170 fast on the transaction counter frame 120 (Fig. 5) has two arms projecting therefrom, upon one of which is pivoted an arm 171. A lever 172 pivoted on the other arm of the bracket 170, is bifurcated at its upper end to straddle a stud 173 carried by the complementary, pivoted arm 171. A bar 174 is pivoted on a stud 175 carried by the lever 172 and has a slot 176 formed therein, through which projects a stud 177 carried by the arm 171. A finger 178 (Fig. 9), formed on the lower end of the lever 172 lies just beneath a stud 179 mounted in the slide 163, previously described.

Upon depression of the "no-sale" key and the operation of machine, the differential mechanism associated with the transaction bank of keys 51 will be arrested in the "no-sale" or "one" position. It will be remembered that the selecting arm 118 (Fig. 5) is also differentially adjusted under control of the depressed transaction key. This arm 118 carries a stud 180 extending across the plane of the bar 174. The outer periphery of this bar is generally concentric with the pivot of the selecting arm 118. As can be seen from Figure 5, however, the bar 174 at the point opposite the first or "no-sale" counter, has a bump 181 in the path of the stud 180. Obviously this bump may be located opposite any of the counters during the manufacture of the machine, as hereinafter pointed out.

As the selecting arm 118 swings upwardly, the stud 180, which escapes the concentric periphery of the bar 174, contacts the bump 181 thereof, and cams the bar 174 radially towards the center of the machine. Due to the connections between the arm 171 and the lever 172, both of which support the bar 174, the outer periphery of the bar 174 will remain generally concentric with the stud 117.

As the bar 174 moves toward the center of the machine, it rocks the lever 172 and the finger 178 thereof, counter-clockwise. The finger 178 engaging beneath the stud 179 (Figs. 8 and 9), on the slide 163, will rock the slide 163 upwardly to remove the stud 162 from the slot 165 in the arm 141. This prevents the latter arm from rocking the hub 160 and its connections and hence throws the clerks' special counter operating means out of operation.

Figure 2:
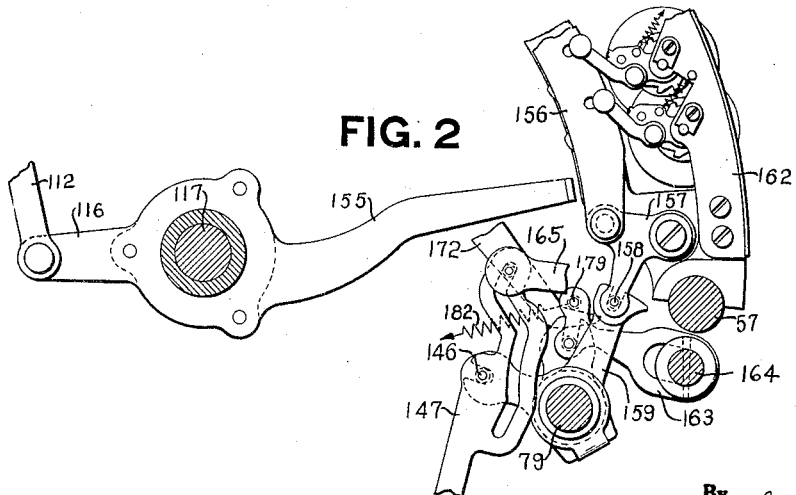
Fig. 2 is a view of the clerks' special counter selecting and disabling mechanism.

When the stud 162 is unseated as above described, it assumes a position in the upper part of the slot in the arm 161, thereby holding this arm and the arm 159 in alinement in the position shown in Fig. 2.

On the succeeding operation, the selecting arm 118 is again differentially positioned according to the transaction key depressed, and if there is no bump 181 on the bar 174 opposite the counter selected, the bar 174 will be returned to its normal outward position, as shown in Fig. 5, by means of a spring 182, one end of which is secured to the stud 179. As the spring 182 restores the lever 172 and the arm 174 to their normal positions, it also lowers the slide 163, as the finger 178 of the lever descends, to position the stud 162 in the slot 165 of the arm 141, and reestablish an operative connection between the arms 141 and 161 in readiness to operate the clerks' special counters.

While the form of bar 174 herein disclosed, and which has just been described, makes use of only one bump 181 to disable the clerk's special counter in one position only, it is not intended to so limit the invention.

Figure 3:
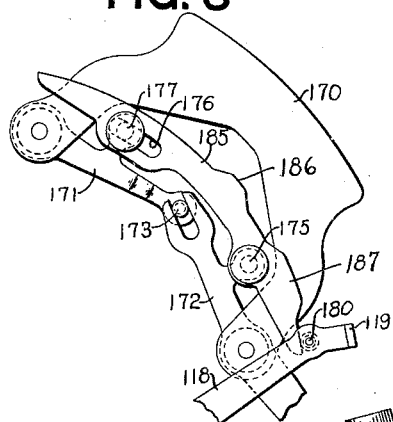
Fig. 3 is a detail view showing a modified form of the disabling bar.

It is obvious that a bump 181 can be placed in any one of the nine positions represented by the nine transaction keys 51, or in any combination of positions. Referring to Fig. 3, the bar 174 is replaced by a bar 185 having thereon two bumps 186 and 187, the latter being long enough to cooperate with two key positions of the arm 118. In this modified form of bar, a clerk's special counter would be disabled on operations of the machine wherein the "no-sale", "paid-out" or "charge" keys were depressed.

While the form of mechanism herein shown and described is admirably adapted to fulfill the objects primarily stated, it is to be understood that it is not intended to confine the invention to the forms or embodiments herein disclosed, for it is susceptible of embodiment in various other forms all coming within the scope of the claims which follow.

What is claimed is:

1. In a machine of the class described, the combination of a plurality of groups of counters, a plurality of groups of manipulative keys, differential mechanisms controlled by said keys for selecting a counter in each of the groups to be actuated, means to actuate the selected counters, and means adjustable by the differential mechanism associated with one group of counters to disable the actuating means for the other group of counters.

2. In a machine of the class described, the combination of a plurality of groups of counters, a plurality of groups of manipulative keys, differential means controlled by said keys for determining which counter in each group is to be actuated, means to actuate the selected counters, and means controlled by certain keys of one of said groups of keys to disable the actuated for the counters selected under control of another of said groups of keys.

3. In a machine of the class described, the combination of a plurality of groups of counters, operating means therefor, differentially movable selecting arms for said counters, and means operated by the selecting arm for one group of counters to disable the operating means for another group of counters.

4. In a machine of the class described, the combination of a plurality of groups of counters, selecting means for each group of counters, individual operating means for said respective groups of counters, driving means for said operating means, and means adjusted by the selecting means for one group of counters to disconnect the driving means from the operating means for the other group of counters.

5. In a machine of the class described, the combination of a plurality of groups of counters, a differentially movable selecting arm for each group of counters, individual operating means for each group of counters, driving means for said operating means, a pin and slot connection between the driving means and the operating means for one of said groups of counters, a shiftable member operable by the selecting arm for one of said groups of counters, and a lever operated by said member to uncouple the pin and slot connection, to render ineffective the operating means for another of said groups of counters.

6. In a machine of the class described, the combination of a plurality of groups of counters, a plurality of differentially movable arms to select a counter to be operated in each group of counters, individual operating means for each group of counters, driving means for said operating means, a pin and slot connection between the driving means and the operating means for one of said groups, a shiftable member having high and low spots thereon, means on the selecting arm for one of said groups adapted, upon movement of said arm, to contact one of the high spots on the member, to shift said bar, and a lever rocked by said member to uncouple the pin and slot connection.

7. In a machine of the class described, the combination with a plurality of groups of counters; and means individual to the respective groups of counters to select the counter in its respective group for operation; of means individual to each group, to operate any counter in the respective groups; driving means connected with the operating means of one of such groups of counters; a releasable coupling to connect the operating means for a plurality of groups of counters, and disabling means controlled by the selecting means for one of said groups of counters, to automatically disconnect the coupling between the operating means for the plurality of groups of counters, when the selecting arm is adjusted to one of its positions.

In testimony whereof I affix my signature.

BERNIS M. SHIPLEY.